(12) United States Patent
Cho et al.

(10) Patent No.: US 9,479,942 B2
(45) Date of Patent: Oct. 25, 2016

(54) METHOD FOR CALCULATING RADIO COVERAGE IN WIRELESS DEVICE

(71) Applicant: ELECTRONICS AND TELECOMMUNICATIONS RESEARCH INSTITUTE, Daejeon (KR)

(72) Inventors: Sang In Cho, Daejeon (KR); Kyu Min Kang, Daejeon (KR); Jae Cheol Park, Daejeon (KR); Byung Jang Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 3 days.

(21) Appl. No.: 14/599,733

(22) Filed: Jan. 19, 2015

(65) Prior Publication Data

US 2015/0257017 A1     Sep. 10, 2015

(30) Foreign Application Priority Data

Mar. 7, 2014   (KR) .................. 10-2014-0027249

(51) Int. Cl.
*H04B 1/00*     (2006.01)
*H04W 16/18*    (2009.01)

(52) U.S. Cl.
CPC ................... *H04W 16/18* (2013.01)

(58) Field of Classification Search
CPC ... H04W 16/14; H04W 24/02; H04W 48/08; H04W 48/16; H04W 64/00; H04W 72/04; H04W 72/0433; H04W 72/0453; H04W 88/12; H04W 8/22
See application file for complete search history.

(56) References Cited

U.S. PATENT DOCUMENTS

| | | | |
|---|---|---|---|
| 6,914,876 B2 | 7/2005 | Rotstein et al. | |
| 2006/0183503 A1* | 8/2006 | Jeffrey Goldberg | H01Q 3/08 455/561 |
| 2009/0016293 A1 | 1/2009 | Kang et al. | |
| 2013/0102344 A1* | 4/2013 | Sawai | H04W 16/14 455/509 |
| 2014/0221000 A1* | 8/2014 | Roberts | H04W 64/00 455/454 |

* cited by examiner

*Primary Examiner* — Ping Hsieh
*Assistant Examiner* — Xin Jia
(74) *Attorney, Agent, or Firm* — Ladas & Parry LLP

(57) ABSTRACT

Disclosed is a method for calculating a radio coverage in a wireless device for calculating a protective distance so as not to allow a secondary user sharing a frequency with a primary user to have an effect of radio interference on the primary user, the method including: calculating a transmission power of a wireless signal transmitted through the frequency by the secondary user; determining a region affected by the wireless signal based on the transmission power of the secondary user; calculating an average ground clearance of the determined region; calculating a height of an installation place of an antenna of the secondary user from the average ground clearance; and calculating the height of the antenna from the average ground clearance by adding a length of the antenna of the secondary user to the calculated height and calculating the radio coverage based on the height from the average ground clearance.

15 Claims, 4 Drawing Sheets

METHOD FOR CALCULATING RADIO COVERAGE IN WIRELESS DEVICE

CROSS-REFERENCE TO RELATED APPLICATIONS

This application claims priority to and the benefit of Korean Patent Application No. 10-2014-0027249 filed in the Korean Intellectual Property Office on Mar. 7, 2014, the entire contents of which are incorporated herein by reference.

TECHNICAL FIELD

The present invention relates to a method for calculating a radio coverage in a wireless device, and more particularly, to a method for calculating a radio coverage in a wireless device capable of calculating a radio coverage of a secondary user by considering a pure height of an antenna of the secondary user sharing and using a frequency and an average ground clearance of an installation region of an antenna.

BACKGROUND ART

When a primary user and a secondary user sharing and using a frequency in wireless communication are present, an use of the primary user needs to be protected from a frequency interference by the secondary user. For example, a wireless device of the secondary user using a TV white space needs to use a frequency while protecting a DTV service of the primary user without causing frequency interference with a DTV receiver of the primary user or a permissible wireless mike which is the existing service in a TV band. To this end, the secondary user needs to use the frequency, having a protective distance, so as to prevent a wireless signal transmitted by the secondary user from arriving at the place where the primary user is present so as not to cause frequency interference with the DTV service of the primary user.

That is, the protective distance needs to be accurately calculated, and a coverage of the wireless signal transmitted from the wireless device of the secondary user, that is, a radio coverage needs to be considered at the time of calculating the protective distance. Even though the wireless signal transmitted from the wireless device of the secondary user arrives at a receiver of the primary user, the wireless signal arrives at power which is smaller than radio power having an effect of frequency interference to rule out the effect of frequency interference. Here, a distance at which the wireless signal transmitted from a transmitter of the secondary user arrives at the power which is smaller than the radio power that may cause frequency interference to the primary user is the protective distance. Therefore, to protect the primary user, there is a need to accurately calculate the radio coverage of the wireless signal generated due to the secondary user. For this purpose, there is a need to accurately calculate a height of an antenna of the secondary user.

SUMMARY OF THE INVENTION

The present invention has been made in an effort to provide a method for calculating a radio coverage in a wireless device capable of accurately calculating a radio coverage of a secondary user to effectively use a shared frequency.

Further, the present invention has been made in an effort to provide a method for calculating a radio coverage in a wireless device capable of calculating an average ground clearance of an installation region of an antenna of a secondary user by considering an output power of a wireless signal transmitted by the secondary user.

An exemplary embodiment of the present invention provides a method for calculating a radio coverage in a wireless device for calculating a protective distance so as not to allow a secondary user sharing a frequency with a primary user to have an effect of radio interference on the primary user, including: calculating a transmission power of a wireless signal transmitted through the frequency by the secondary user; determining a region affected by the wireless signal based on the transmission power of the secondary user; calculating an average ground clearance of the determined region; calculating a height of an installation place of an antenna of the secondary user from the average ground clearance; and calculating the height of the antenna from the average ground clearance by adding a length of the antenna of the secondary user to the calculated height and calculating the radio coverage based on the height from the average ground clearance.

The determined region may be a circle and the installation place of the antenna of the secondary user may be a center of the circle.

The calculating of the average ground clearance may include sampling positions present in a radius of the circle at a preset constant interval; and calculating an average altitude of the sampled positions, and the sampling and the calculating of the average altitude may be repeatedly performed on another radius spaced apart from the radius by a preset constant angle.

The average ground clearance may be the average altitude of the determined region to a predetermined area of the determined region.

The primary user may be a user of a DTV service and the secondary user may be a TVBD service sharing a frequency with the DTV service.

The method may further include: calculating the protective distance depending on the radio coverage.

The transmission power of the secondary user may be a maximum transmission power among the transmission powers of the wireless signal transmitted by the secondary user sharing the frequency.

The determined region may be determined based on a data table by determining a region affected by the wireless signal depending on the transmission power in advance.

According to the exemplary embodiments of the present invention, the method for calculating a radio coverage in a wireless device may accurately calculate the radio coverage of the secondary user so as to efficiently use the shared frequency.

Further, the method for calculating a radio coverage in a wireless device may calculate the average ground clearance of the installation region of the antenna of the secondary user by considering the output power of the wireless signal transmitted by the secondary user.

Figure 1:
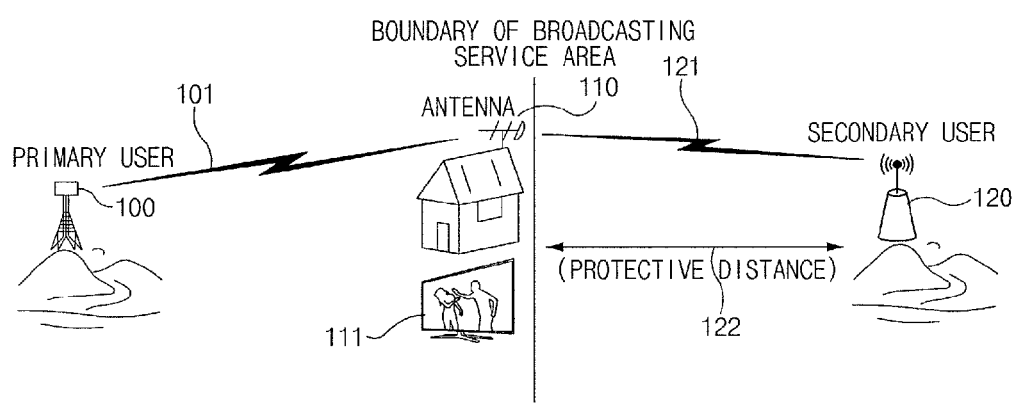
FIG. 1 is a diagram illustrating a primary user and a secondary user sharing a frequency.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Various advantages and features of the present invention and methods accomplishing thereof will become apparent from the following description of embodiments with reference to the accompanying drawings. However, the present invention is not limited to the exemplary embodiments described herein, and may be specified in other forms. However, the present exemplary embodiments are provided for describing the present invention in detail so that those skilled in the art may easily work the technical spirit of the present invention.

In the drawings, the exemplary embodiments of the present invention are not limited to the illustrated specific form, but are exaggerated for clarity. Herein, specific terms have been used, but are just used for the purpose of describing the present invention and are not used for defining the meaning or limiting the scope of the present invention, which is disclosed in the appended claims.

In the present specification, an expression "and/or" is used as a meaning that at least one of the enumerated constructional elements is included. Further, an expression "coupled to/assembled with" is used as a meaning that one constructional element is directly coupled to another constructional element or indirectly connected to another constructional element through another constructional element. Unless particularly stated otherwise in the present specification, a singular form also includes a plural form. Further, a constructional element, a step, an operation, and an element mentioned with "include" or "including" used in the specification means existence or addition of one or more other constructional elements, steps, operations, and elements.

Hereinafter, exemplary embodiments of the present invention will be described in detail with reference to the accompanying drawings.

A protective distance is a distance that does not have an effect of frequency interference on a frequency used by a primary user due to a wireless signal of the secondary user sharing the frequency used by the primary user and can be changed depending on a radio coverage of a wireless signal transmitted from an antenna of the secondary user.

The radio coverage at which radio of the wireless signal transmitted by the wireless device is transmitted is increased as a height of an antenna transmitting the wireless signal is increased. As a result, to calculate the radio coverage, there is a need to calculate the height of the antenna transmitting the wireless signal. In calculating the height of the antenna, a pure height of the antenna of the wireless device and an installation place (building height) of the antenna and an average ground clearance around the place need to be considered. That is, when an installation place of a transmitter of the secondary user is relatively higher than a peripheral area of the place, the radio coverage is increased and therefore it is highly likely to have an effect of frequency interference on the primary user. To the contrary, when the installation place of the transmitter of the secondary user is relatively lower than the peripheral area of the place, the radio coverage is reduced and therefore it is less likely to have the effect of frequency interference on the primary user.

Therefore, to accurately calculate the radio coverage of the secondary user sharing a frequency used by the primary user, there is a need to accurately calculate how high (hereinafter, referred to as 'height of an antenna of the secondary user') the transmitter of the secondary user, more accurately, the antenna included in the transmitter is installed from the ground. According to the exemplary embodiment of the present invention, to accurately calculate the radio coverage of the secondary user, a transmission power of the wireless signal transmitted through the frequency by the secondary user is considered.

FIG. 1 is a diagram illustrating a primary user and a secondary user sharing a frequency. Referring to FIG. 1, the secondary user transmitting the wireless signal through the frequency used by the primary user is positioned at a point spaced apart from service users 110 and 111 using services provided by the primary user as much as a protective distance.

Hereinafter, for convenience of explanation, an example in which the primary user is a DTV service and the secondary user is a TVBD service will be described. However, the exemplary embodiment of the present invention is not limited to the above example.

The TVBD service which is the secondary user sharing the frequency needs to share the frequency in the range which does not have the effect of frequency interference on the DTV service which is the primary user. A transmitting station 100 which provides the DTV service is positioned at a high place to transmit the DTV signal. The DTV signal transmitted from the transmitting station 100 is transferred (101) up to a DTV antenna 110 of the DTV service user at a boundary of a broadcasting service area. The DTV service user receives the transferred DTV signal to be able to view DTV through the DTV receiver 111.

Meanwhile, a transmitting station 120 providing the TVBD service which is the secondary service positioned outside the boundary of the broadcasting service area of the DTV service which is the primary service transmits the TVBD signal for providing the TVBD service. The TVBD signal transmitted from the transmitting station 120 may be transferred up to the boundary of the broadcasting service area of the DTV service (121) and may be received by the DTV antenna 110 of the DTV service user positioned at the boundary of the broadcasting service area. In this case, as a result of comparing the TVBD signal received by the DTV antenna 110 with the DTV signal received by the DTV antenna 110, if the TVBD signal is sufficiently weaker than the DTV signal, there is no occurrence of interference of the TVBD signal with the DTV signal on the DTV service user. As a result of comparing the TVBD signal received by the DTV antenna 110 with the DTV signal received by the DTV antenna 110, if the TVBD signal is sufficiently stronger than the DTV signal, the interference of the TVBD signal with the DTV signal occurs and thus the reception of the DTV signal of the DTV service user is distorted, such that the normal DTV service may not be used.

Therefore, so as not to have the effect of frequency interference on the use of the DTV service of the DTV receiver 111, the power of the TVBD signal received by the DTV antenna 110 needs to be relatively sufficiently small. Consequently, to remove the effect of interference between the TVBD signal and the DTV signal due to the power of the TVBD signal received by the DTV antenna 110, a protective distance 122 of the secondary user needs to be sufficient. However, when the protective distance 122 is far larger than necessary, since an available frequency is reduced, to effectively share and use the frequency, it is very important to accurately calculate the protective distance. Here, the protective distance has a connection with the radio coverage of the TVBD signal, the radio coverage of the TVBD signal has a connection with the height of the antenna included in the transmitting station 120 transmitting the TVBD signal, and the height of the antenna may be calculated based on an average ground clearance of a peripheral area of an installation point of the antenna and a length of the antenna.

Figure 2:
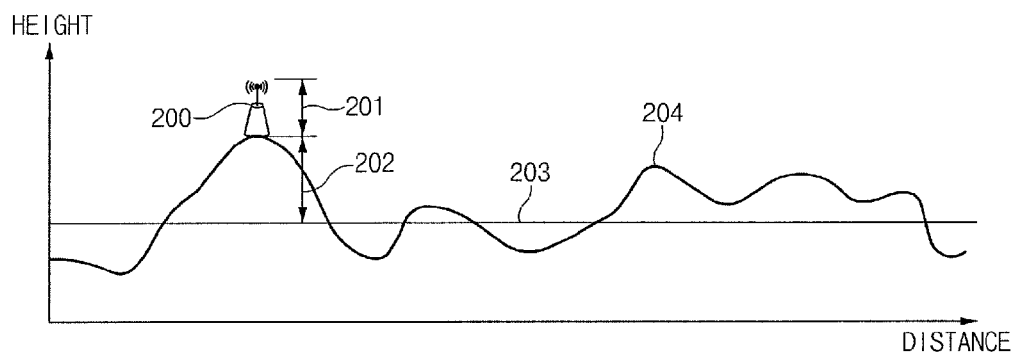
FIG. 2 is a diagram illustrating a height of an antenna and an average ground clearance which are used in a method for calculating a radio coverage in a wireless device according to an exemplary embodiment of the present invention.

FIG. 2 is a diagram illustrating a height of an antenna and an average ground clearance which are used in a method for calculating a radio coverage in a wireless device according to an exemplary embodiment of the present invention.

To calculate the radio coverage of the wireless signal transmitted by the secondary user 200, the height of the antenna of the secondary user needs to be calculated. However, as the height of the antenna mentioned herein, a height 201 of the antenna itself of the secondary user 200 and how much higher the installation point of the antenna of the secondary user 200 is than the peripheral area need to be considered. Here, to determine how much higher the antenna of the secondary user 200 is installed than the peripheral area, there is a need to know an average of altitudes of the peripheral area. Meanwhile, an average ground clearance 203 indicates the average of altitudes.

FIG. 2 illustrates topography 204 of the peripheral area along with the average ground clearance 203. For example, when the secondary user 200 is positioned in a specific building, as illustrated in FIG. 2, the topography 204 at which the secondary user 200 is positioned is relatively higher than that of the peripheral area, but since the topography 204 of the peripheral area also has various heights, a height 202 of the installation point of the antenna of the secondary user 200 may be calculated based on the foregoing average ground clearance 203. The height of the antenna of the secondary user from the average ground clearance 202 of the peripheral area may be calculated by adding the height 201 of the antenna itself to the height 202 of the installation point of the antenna. Therefore, when the average ground clearance 203 is accurately calculated, the height of the antenna of the secondary user 200 is accurately calculated and when the height of the antenna of the secondary user 200 is accurately calculated, the radio coverage and the protective distance are also accurately calculated later.

Figure 3:
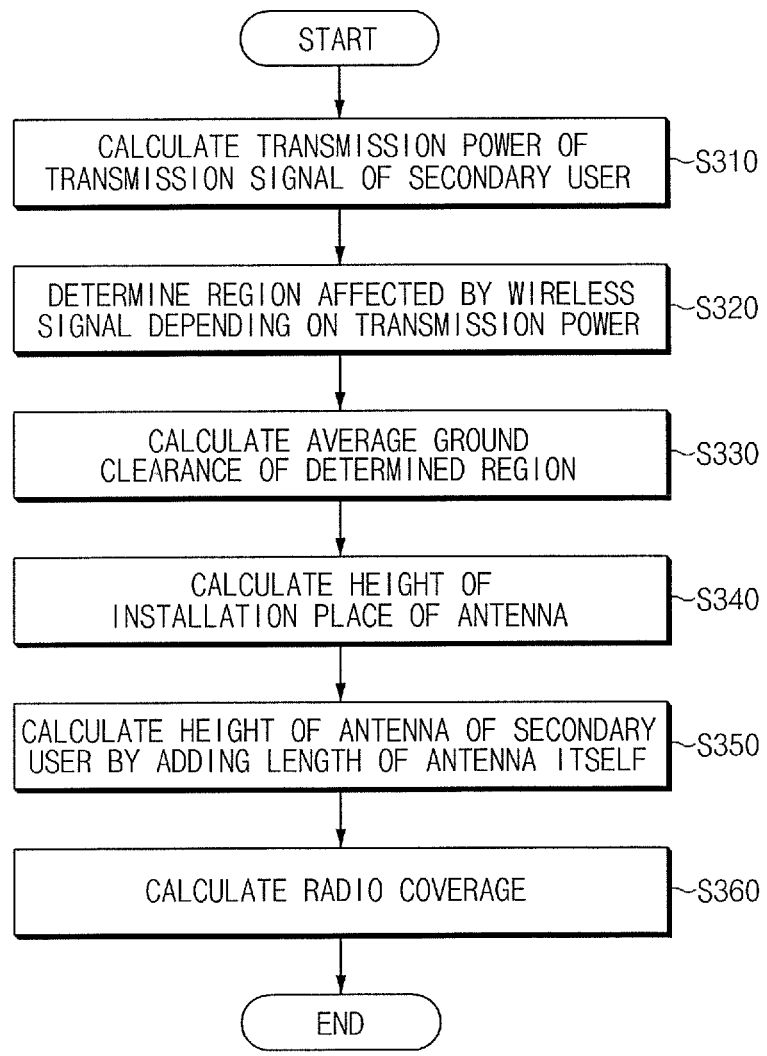
FIG. 3 is a flow chart illustrating the method for calculating a radio coverage in a wireless device according to the exemplary embodiment of the present invention.
Figure 4:
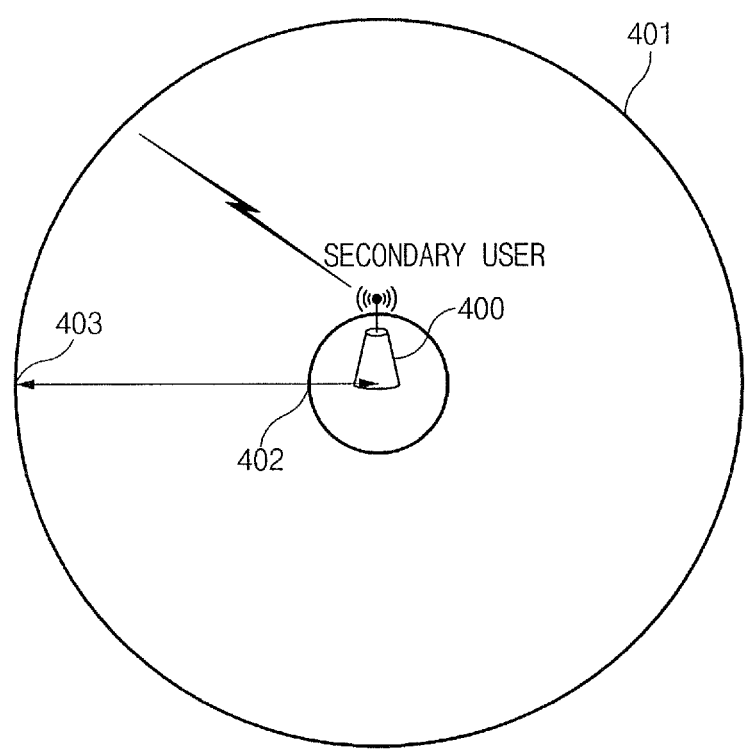
FIG. 4 is a diagram illustrating a region determined to calculate the average ground clearance which is used in the method for calculating a radio coverage in a wireless device according to the exemplary embodiment of the present invention.

FIG. 3 is a flow chart illustrating the method for calculating a radio coverage in a wireless device according to the exemplary embodiment of the present invention and FIG. 4 is a diagram illustrating a region determined to calculate the average ground clearance which is used in the method for calculating a radio coverage in a wireless device according to the exemplary embodiment of the present invention.

The method for calculating a radio coverage in a wireless device according to the exemplary embodiment of the present invention will be described with reference to FIGS. 3 and 4.

The method for calculating a radio coverage in a wireless device according to the exemplary embodiment of the present invention considers a transmission power of a wireless signal transmitted by a secondary user 400 in accurately calculating the average ground clearance of a peripheral region 401 of the secondary user 400 to accurately calculate the radio coverage and the protective distance.

First, the secondary user 400 calculates the transmission power of the wireless signal transmitted through the frequency shared with the primary user (S310). Here, the transmission power is preferably the largest transmission power among the transmission powers of the wireless signal transmitted by the secondary user 400 sharing the frequency.

Next, the region 401 affected by the interference due to the wireless signal transmitted by the secondary user 400 is determined based on the calculated transmission power of the secondary user 400 (S320). Here, the determined region may be a circle as illustrated in FIG. 4 and in this case, the installation place of the antenna of the secondary user may be a center of the circle. Further, the region affected by the wireless signal is determined in advance in response to the transmission power of the wireless signal transmitted by the secondary user and thus the region 401 affected by the interference due to the wireless signal transmitted by the secondary user 400 may be determined based on a data table.

Next, the average ground clearance of the region 401 affected by the interference due to the wireless signal determined in S320 is calculated (S330). Here, when the region 401 determined in S320 is the circle, specific positions present at radii 402 and 403 of the circle are sampled at preset constant intervals and an average ground clearance of the radii 402 and 403 may be calculated by calculating an average of altitudes of the sampled positions. The foregoing process is repeatedly performed on another radius spaced apart from the radii 402 and 403 by a preset constant angle and thus the overall average ground clearance inside the circular region 401 determined in S320 may be calculated. In detail, the average ground clearance is preferably the average of the altitudes inside the determined region 401 to an area of the region 401 determined in S320.

Next, the height of the place where the antenna of the secondary user is installed from the average ground clearance calculated in S330 is calculated (S340). Here, the height of the installation place of the antenna of the secondary user means a distance spaced apart from the average ground clearance as described with reference to FIG. 2.

Next, the distance (height) of the antenna of the secondary user spaced apart from the average ground clearance calculated in S340 is calculated (S350) by adding the length (vertical direction) of the antenna itself of the secondary user to the height of the installation place of the antenna of the secondary user calculated in S340.

Next, the radio coverage described with reference with FIG. 1 is calculated based on the height of the antenna of the secondary user by adding the distance spaced apart from the average ground clearance calculated in S350 (S360).

Next, the method for calculating a radio coverage in a wireless device according to the exemplary embodiment of the present invention uses the radio coverage calculated in S360 to calculate the protective distance for stable communication environment of the primary user described above.

Consequently, according to the method for calculating a radio coverage in a wireless device according to the exemplary embodiment of the present invention, to accurately calculate the radio coverage and the protective distance, the region affected by the interference is primarily determined based on the transmission power of the wireless signal transmitted by the secondary user and the average ground clearance inside the region is calculated, such that the distance (height) of the antenna of the secondary user spaced apart from the peripheral region may be more accurately calculated. By doing so, since the radio coverage and the protective distance are also accurately calculated, it is possible to efficiently share the frequency without having the effect of interference on the communication environment of the primary user sharing the frequency.

As described above, the present invention has been described with reference to the exemplary embodiment of the present invention, but those skilled in the art will understand that the present invention may be variously modified and changed within the scope without departing from the spirit and the area of the present invention defined in the claims. Accordingly, the scope of the present invention should not be limited to and defined by the aforementioned exemplary embodiment, and should be defined by the accompanying claims and equivalents thereof. In consideration of the aforementioned contents, if a change and a modification of the present invention belong to the scope of the claims below and the equivalents thereof, the present invention is considered to include the change and the modification of the present invention.

What is claimed is:

1. A method for calculating a radio coverage in a wireless device for calculating a protective distance so as not to allow a secondary user sharing a frequency with a primary user to have an effect of radio interference on the primary user, the method comprising:
   calculating a transmission power of a wireless signal transmitted through the frequency by the secondary user;
   determining a region affected by the wireless signal based on the transmission power of the secondary user;
   calculating an average ground clearance of the determined region, wherein the calculating of the average ground clearance includes:
     sampling positions present in a radius of a circle centered about the secondary user at a preset constant interval; and
     calculating an average altitude of the sampled positions, and
     the sampling and the calculating of the average altitude are repeatedly performed on another radius spaced apart from the radius by a preset constant angle;
   calculating a height of an installation place of an antenna of the secondary user from the average ground clearance; and
   calculating the height of the antenna from the average ground clearance by adding a length of the antenna of the secondary user to the calculated height and calculating the radio coverage based on the height from the average ground clearance.

2. The method of claim 1, wherein the determined region is a circle and the installation place of the antenna of the secondary user is a center of the circle.

3. The method of claim 1, wherein the average ground clearance is the average altitude of the determined region to a predetermined area of the determined region.

4. The method of claim 1, wherein the primary user is a user of a DTV service, and
   the secondary user is a TVBD service sharing a frequency with the DTV service.

5. The method of claim 1, further comprising:
   calculating the protective distance depending on the radio coverage.

6. The method of claim 1, wherein the transmission power of the secondary user is a maximum transmission power among the transmission powers of the wireless signal transmitted by the secondary user sharing the frequency.

7. The method of claim 1, wherein the determined region is determined based on a data table by determining a region affected by the wireless signal depending on the transmission power in advance.

8. A method for calculating a radio coverage in a wireless device for calculating a protective distance so as not to allow a secondary user sharing a frequency with a primary user to have an effect of radio interference on the primary user, the method comprising:
   calculating a transmission power of a wireless signal transmitted through the frequency by the secondary user;
   determining a region affected by the wireless signal based on the transmission power of the secondary user;
   calculating an average ground clearance of the determined region;
   calculating a height of an installation place of an antenna of the secondary user from the average ground clearance; and
   calculating the height of the antenna from the average ground clearance by adding a length of the antenna of the secondary user to the calculated height and calculating the radio coverage based on the height from the average ground clearance
   wherein the determined region is a circle and the installation place of the antenna of the secondary user is a center of the circle,
   wherein the calculating of the average ground clearance includes:
     sampling positions present in a radius of the circle at a preset constant interval; and
     calculating an average altitude of the sampled positions, and
     the sampling and the calculating of the average altitude are repeatedly performed on another radius spaced apart from the radius by a preset constant angle.

9. The method of claim 8, wherein the average ground clearance is the average altitude of the determined region to a predetermined area of the determined region.

10. The method of claim 8, wherein the primary user is a user of a DTV service, and
   the secondary user is a TVBD service sharing a frequency with the DTV service.

11. The method of claim 8, further comprising:
   calculating the protective distance depending on the radio coverage.

12. The method of claim 8, wherein the transmission power of the secondary user is a maximum transmission power among the transmission powers of the wireless signal transmitted by the secondary user sharing the frequency.

13. The method of claim 8, wherein the determined region is determined based on a data table by determining a region affected by the wireless signal depending on the transmission power in advance.

14. The method of claim 5, wherein the protective distance is a distance at which the transmission power of the wireless signal transmitted through the frequency by the secondary user is less than a radio power that may cause frequency interference to the primary user.

15. The method of claim 11, wherein the protective distance is a distance at which the transmission power of the wireless signal transmitted through the frequency by the secondary user is less than a radio power that may cause frequency interference to the primary user.

* * * * *